United States Patent [19]
Arnault

[11] 3,811,644
[45] May 21, 1974

[54] PIPE HANGER

[76] Inventor: Warren J. Arnault, Main St., Raymond, N.H. 03077

[22] Filed: Nov. 22, 1972

[21] Appl. No.: 308,705

[52] U.S. Cl.............. 248/56, 4/252 R, 137/362, 248/300, 285/56, 285/64
[51] Int. Cl................................................ F16l 5/00
[58] Field of Search.......... 248/56, 57, 221, 58, 62, 248/300, 72, 230, 27, DIG. 6; 285/56, 64, 42, 43; 138/106, 107, 113; 137/343, 356, 357, 358, 359, 360, 365, 362, 366; 52/219; 4/252 R, 252 A, 68

[56] References Cited
UNITED STATES PATENTS

| | | | |
|---|---|---|---|
| 1,997,185 | 4/1935 | Sprague et al. | 248/27 UX |
| 3,435,467 | 4/1969 | Flegel et al. | 4/252 R |
| 1,494,234 | 5/1924 | Gossett | 248/56 X |
| 751,443 | 2/1904 | Anthes | 248/57 |
| 3,105,664 | 10/1963 | Poradun | 248/56 |
| 1,533,444 | 4/1925 | Mohr | 4/252 R |
| 3,521,051 | 7/1970 | Wullschleger et al. | 248/56 |
| 3,004,740 | 10/1961 | Lane | 248/57 |
| 3,495,283 | 2/1970 | Studer | 4/252 R |
| 2,439,091 | 4/1948 | Keating | 248/27 |
| 2,721,334 | 10/1955 | Sanders | 248/225 X |

Primary Examiner—Roy D. Frazier
Assistant Examiner—Rodney H. Bonck
Attorney, Agent, or Firm—Thomas N. Tarrant

[57] ABSTRACT

A hanger in the form of a U-shaped bracket for waste lines in buildings having concrete plank floors. Flanges are provided toward the closed end of the U for supporting the bracket on top of concrete planks siding the waste line opening. Downwardly extending tabs at the open end of the U extend between the planks to prevent the U from opening and upstanding portions of the bracket are provided with fastening devices to secure a waste line extending through the bracket and prevent downward movement thereof.

7 Claims, 3 Drawing Figures

PATENTED MAY 21 1974 3,811,644
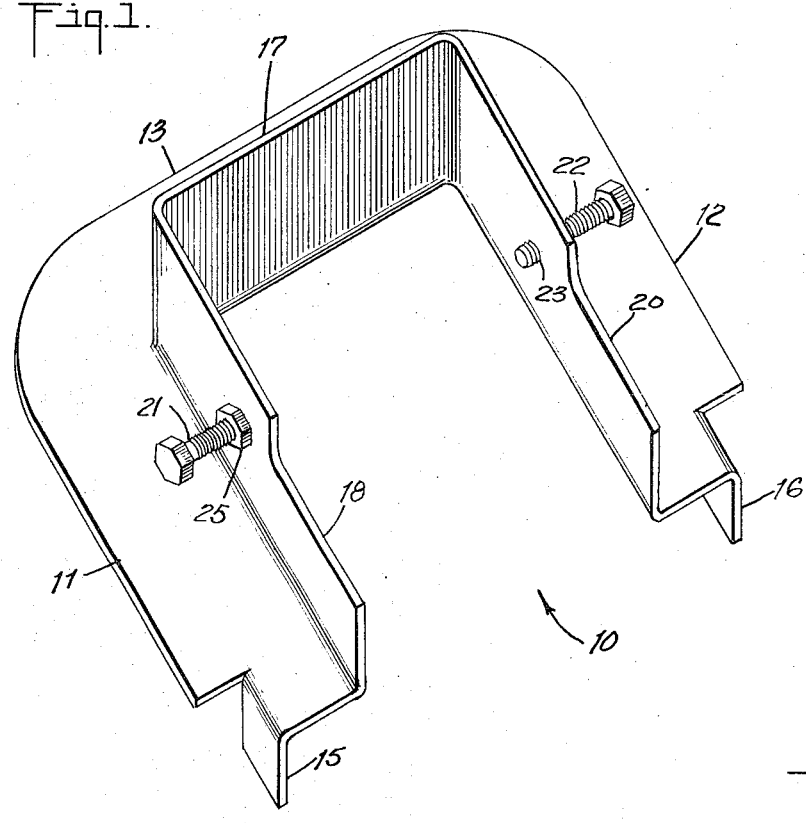
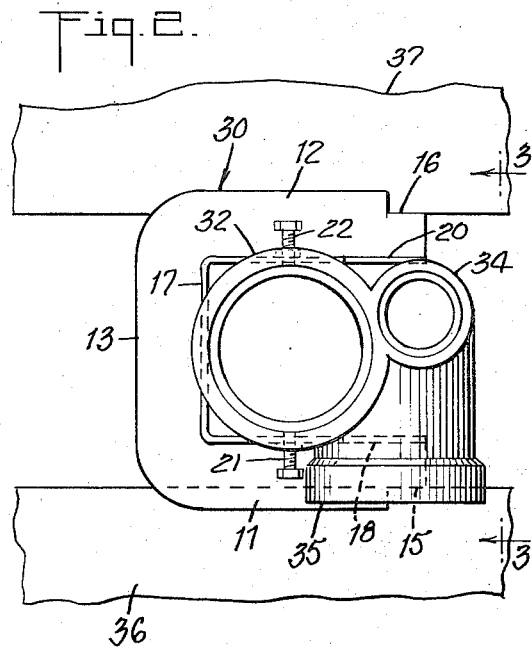
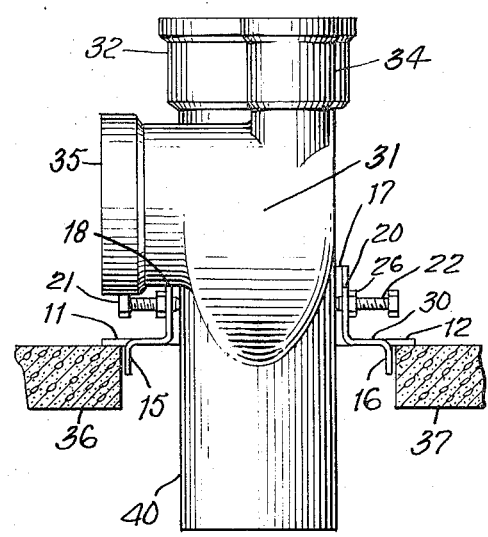

PIPE HANGER

BACKGROUND OF THE INVENTION

1. Field of the Invention

The invention relates to pipe hangers used in the plumbing trade and particularly to such a hanger for supporting waste lines between concrete planks in multiple story buildings having concrete-plank floors.

2. Description of the Prior Art

Various types of straps, hooks, clamps and braces have been used in the past for securing both vertical and horizontal runs of pipe. Closet bends for water closets wasting downward through the floor have used adaptive flanges for securing the open end to the floor surface prior to installation of the closet. With the rising use of concrete-plank floors in multiple story buildings, back outlet water closets are coming into use that waste through the wall above the finished floor. This avoids cutting holes in the concrete and some other difficulties, but raises a new problem. Conventionally, in buildings using concrete-plank floors, a space is left between certain of the planks for vertical utility and plumbing runs. Waste lines and stacks, usually of cast iron, are installed and tested prior to attaching fixtures. In multiple story buildings, the weight of the water used in the lines for test purposes usually produces some settling and throws the alignment of the through-the-wall waste line openings so that the water closets fail to match. This is extremely troublesome since it is not possible to lower the position of the water closets. Where cast iron pipe is used with leaded joints, settling is particularly bad and occurs both during and after installation.

SUMMARY OF THE INVENTION

Now in accordance with the present invention, a hanger is provided that secures the vertical position of waste lines passing through concrete-plank floors enabling precise alignment of back outlet water closet waste connections. The invention provides a bracket that rests upon flanges straddling the utility opening in a concrete-plank floor. The bracket is U-shaped to provide an open end for easy installation. Downwardly depending tabs at the open end serve to secure the bracket between the adjoining planks and simultaneously prevent expansion of the open end. Upstanding portions are provided with fastening devices such as setscrews for securing the bracket to a waste line.

Thus, it is an object of the invention to provide a novel pipe hanger to stop vertical settling of waste pipes passing between concrete-plank floors.

It is a further object of the invention to provide a bracket that cooperates with a concrete-plank floor and a waste line with substantially horizontal connections to maintain alignment of the horizontal connections.

It is a further object of the invention to provide a U-shaped bracket for supporting a waste line for back outlet connection of a water closet.

BRIEF DESCRIPTION OF THE DRAWING

FIG. 1 is a perspective view of the inventive bracket.

FIG. 2 is a plan view of the bracket of FIG. 1 supporting a waste line component between two concrete-planks.

FIG. 3 is an elevation in partial section through 3—3 of FIG. 2.

DESCRIPTION OF THE PREFERRED EMBODIMENT

Concrete-plank floors are commonly laid with certain standard separations at a location for vertical utility runs. For example, eight inches and ten inches are both commonly used spacings. This standardization of spacing makes possible the mass production of a simple pipe supporting bracket designed to lock in between the spaced planks and support the vertical position of waste lines passing between the planks. A preferred bracket, according to the invention, is depicted in FIG. 1 in the form of a U having open end 10 enabling the bracket to be passed readily around a vertical pipe. Horizontally extending flanges 11 and 12 provide a support surface for the bracket on the spaced planks. Flange portion 13 extending along the closed end of the U has no support function and may be omitted, but has been used to strengthen the bracket structure at its closed end. While FIG. 2 shows tabs 15 and 16 tightly abutting planks 36 and 37, FIG. 3 shows tabs 15 and 16 slightly spaced from planks 36 and 37 as they would be until screws 21 and 22 are fully tightened, spreading open end 10. Thus FIG. 2 illustrates the fully tightened condition, while FIG. 3 depicts the condition before final tightening. At open end 10, tabs 15 and 16, which may be end portions of flanges 11 and 12 respectively bent down, are arranged to extend downward between two concrete-planks that flanges 11 and 12 are resting on top of. Tabs 15 and 16 are spaced to abut the sides of the concrete planks when the bracket is tightened. Upstanding from the inside edges of flanges 11 and 12 is frame 17. Frame 17 is partially cut away at ends 18 and 20 near open end 10. The cut away portions will be understood in the description of FIGS. 2 and 3.

Cooperating with frame 17 is means to secure or fasten pipe 40 extending vertically through frame 17. While this means to fasten may be any of various clamping means, a preferred means to fasten is setscrews 21 and 22 threaded through threaded holes 23 in frame 17. Setscrews 21 and 22 are suitably provided with lock nuts 25 and 26 to prevent screws 21 and 22 from loosening.

The pipe hanger in FIG. 1 has preferably been made of metal but be made of any material having sufficient strength. When making the hanger of metal, it may be cast or forged or it may be stamped from sheet metal. Satisfactory hangers have been made from lengths of angle iron cut and bent as required.

FIGS. 2 and 3 depict pipe hanger 30 positioned between two concrete floor planks 36 and 37 and supporting a section 31 of a waste line component depicted as a section for connection to a water closet having a back outlet. For this purpose, pipe section 31 has main vertical pipe 32, vertical vent 34, and substantially horizontal water closet connection 35. Flange 11 rests on concrete plank 36 while flange 12 rests on spaced concrete plank 37. Setscrews 21 and 22 are set into the sides of pipe 32. Downwardly depending tabs 15 and 16 extend downwardly abutting the inside edge of planks 36 and 37 respectively.

FIG. 3 is an elevation in partial section along line 3—3 of FIG. 2. In FIG. 3, it will be seen that pipe 32 is a continuation of a vertical waste line 40. The cut away end 18 of frame 17 provides clearance for water closet connection 35. While cut away 20 has no purpose in the arrangement depicted in FIGS. 2 and 3, reversed configurations of pipe section 31 require cut away 20 and the use of both cut aways 18 and 20 on all brackets reduce the number of different configurations that must be manufactured and stocked.

In operation, hangers 30 are positioned at the location of each water closet at some point during the assembly of the waste line and prior to sealing the joints of the adjacent sections. Most back outlet water closets have their waste outlets centered four inches above the floor and brackets 30 are preferably designed with their cut away portions 20 and 18 dimensioned to provide this spacing. In some cases it has been found that there are variations in castings of waste line components so that cut away portions 18 and 20 must leave extra clearance and measurement must be relied on for correct spacing. When the spacing of waste connection 35 from the floor has been checked by measurement, locating screws 21 and 22 are tightened into the walls of pipe 32 pinning its vertical position. It will be recognized that tightening screws 21 and 22 will provide pressure tending to open frame 17 and frame 17 will not readily spread without breaking at the closed end. Any spreading would be expected to occur at open end 10. However, at open end 10, downward depending tabs 15 and 16 bear against the sides of the adjoining concrete planks so as to prevent opening of frame 17. Tabs 15 and 16 simultaneously provide a locating function both upon inserting the hanger and after it is in position.

While the invention has been described with relation to a specific embodiment, it is to be recognized that, modified as necessary, it is contemplated as a supporting bracket for different types of waste line sections, rising through utility openings in concrete-plank floors where vertical position of the waste line section is critical. It is further contemplated that setscrews 21 and 22 can be replaced by various types of locking jaws, clamps, or other securing devices brought to bear against the pipe section by screw means, spring pressure, any of various locking means, or other usual methods. Thus, it is intended to cover the invention within the scope of the appended claims.

I claim:

1. A pipe hanger for supporting waste line passing vertically between two spaced concrete planks of a concrete-plank floor comprising:
   a. flanges for resting on said two concrete planks;
   b. a frame upstanding from said flanges having a closed end, for spanning the space between said spaced concrete planks, and an open end, said frame defining a substantially rectangular aperture open at said open end for passage about a pipe;
   c. two downwardly directed tabs depending from said flanges spaced to abut the inside edges of said spaced concrete planks; and,
   d. fastening means engaged with said frame for securing said frame to a pipe passing vertically through said substantially rectangular aperture.

2. A pipe hanger according to claim 1 wherein said fastening means are setscrews threaded through said frame for bearing against a waste line component passing therethrough whereby tightening of said setscrews tends to spread said open end forcing said tabs against said planks.

3. A pipe hanger according to claim 1 wherein said frame is cut away adjacent said open end for supporting a substantially horizontally directed pipe connection a predetermined distance above said concrete planks.

4. A pipe hanger according to claim 1 wherein said downwardly directed tabs are positioned substantially at said open end.

5. A pipe hanger according to claim 1 wherein said flanges, said frame, and said tabs are made of one integral piece of metal.

6. A pipe hanger according to claim 5 having the form of a U-shaped bracket.

7. A pipe hanger according to claim 6 comprising a length of angle iron cut and formed to shape.

* * * * *